US012731932B2

(12) United States Patent
Tan

(10) Patent No.: US 12,731,932 B2
(45) Date of Patent: Sep. 8, 2026

(54) TERMINAL MODULE AND DATA CABLE INCLUDING THE TERMINAL MODULE

(71) Applicant: DONGGUAN YOUHECHUANG ELECTRONIC TECHNOLOGY CO., LTD., Dongguan City (CN)

(72) Inventor: Hongping Tan, Dongguan City (CN)

(73) Assignee: DONGGUAN YOUHECHUANG ELECTRONIC TECHNOLOGY CO., LTD., Dongguan City (CN)

( * ) Notice: Subject to any disclaimer, the term of this patent is extended or adjusted under 35 U.S.C. 154(b) by 0 days.

(21) Appl. No.: 19/376,809

(22) Filed: Oct. 31, 2025

(65) Prior Publication Data

US 2026/0128543 A1 May 7, 2026

(30) Foreign Application Priority Data

Nov. 1, 2024 (CN) ......................... 202422676045.2

(51) Int. Cl.

*H01R 13/26* (2006.01)
*H01R 13/405* (2006.01)
*H01R 13/62* (2006.01)
*H01R 13/629* (2006.01)

(52) U.S. Cl.

CPC ........... *H01R 13/26* (2013.01); *H01R 13/405* (2013.01); *H01R 13/629* (2013.01); *H01R 13/6205* (2013.01)

(58) Field of Classification Search

None

See application file for complete search history.

(56) References Cited

U.S. PATENT DOCUMENTS

| | | | | |
|---|---|---|---|---|
| 6,371,817 | B1 * | 4/2002 | Shi | H01R 43/24 439/736 |
| 7,578,700 | B2 * | 8/2009 | Xiong | H01R 13/6477 439/722 |
| 7,727,028 | B1 * | 6/2010 | Zhang | H01R 12/716 439/108 |
| 9,979,138 | B1 * | 5/2018 | Chen | G01K 7/24 |
| 2021/0013682 | A1 * | 1/2021 | Zhang | H01R 43/16 |
| 2023/0361517 | A1 * | 11/2023 | Liu | H01R 43/24 |

FOREIGN PATENT DOCUMENTS

| | | |
|---|---|---|
| CN | 201829796 U | 5/2011 |
| CN | 216773558 U | 6/2022 |

* cited by examiner

*Primary Examiner* — Oscar C Jimenez
(74) *Attorney, Agent, or Firm* — Cheng-Ju Chiang

(57) ABSTRACT

The disclosure relates to a terminal module and data cable. The terminal module comprises two groups of terminals. Each terminal comprises a first transition section and a contact section connected in sequence. The direction of the terminal towards an adjacent terminal is defined as the width direction. Because a plurality of first transition sections are bent in the same direction along the width direction, the contact section of each terminal is offset relative to the end of the first transition section away from the contact section in the width direction. This offset forms an avoidance structure. Compared with the existing groups of terminals, the avoidance structures of the present invention leave through gaps between adjacent contact sections. During injection molding, the sufficient gaps ensure the smooth injection and full filling of plastic, to ensure the overall structural strength and durability.

15 Claims, 10 Drawing Sheets

TERMINAL MODULE AND DATA CABLE INCLUDING THE TERMINAL MODULE

TECHNICAL FIELD

The present disclosure relates to the technical field of electronic device accessories, more particularly to a group of terminals, terminal module, terminal module molding method and data cable.

BACKGROUND

A group of terminals is a commonly used component for realizing circuit connection and transmission. In conventional manufacturing processes, the group of terminals is typically placed into an injection mold. After plastic injection, the mating strip connected to and matched with the group of terminals is cut, thus achieving integrated molding of the group of terminals and the injection-molded part. However, for the terminal of existing group of terminals, there is no avoidance structure in the width direction. When two upper and lower groups of terminals are arranged alternately, the contact sections of the upper and lower terminals are interleaved, which hinders injection molding. Sufficient gaps cannot be left for the plastic to flow smoothly into the space between the upper and lower groups of terminals, easily causing voids inside the injection-molded part, thus reducing the overall structural strength and durability.

SUMMARY

In order to solve the above problems, the present disclosure provides a group of terminals, terminal module, terminal module molding method and data cable.

To solve the above technical problems, the present invention provides a group of terminals in one embodiment comprising a plurality of terminals arranged at intervals, wherein each terminal comprises a first transition section and a contact section connected in sequence, the direction of the terminal toward the adjacent terminal is defined as the width direction, a plurality of the first transition sections are bent in the same direction along the width direction.

To solve the above technical problems, the present invention provides another technical solution in a further embodiment as follows: A terminal module, comprising an insulating piece and two groups of terminals, wherein each group of terminals comprises a plurality of terminals arranged at intervals; each terminal comprises a first transition section and a contact section connected in sequence; the direction of the terminal toward the adjacent terminal is defined as the width direction; a plurality of the first transition sections are bent in the same direction along the width direction; the two groups of terminals are disposed on the insulating piece, and the contact section of each terminal is partially exposed out of the insulating piece forming a first contact point; a gap is formed between two adjacent contact sections of each group of terminals, the corresponding gaps of the two groups of terminals are through, and the two groups of terminals are mated with the insulating piece.

To solve the above technical problems, the present invention provides another technical solution in another embodiment as follows: A method for molding a terminal module, comprising: arranging two groups of terminals oppositely within a cavity of an injection mold, each group of terminals comprises a plurality of terminals arranged at intervals; each terminal comprises a first transition section and a contact section connected in sequence; the direction of the terminal towards an adjacent terminal is defined as the width direction, a plurality of first transition sections are bent in the same direction along the width direction, so that the contact sections of the two groups of terminals overlap to form gaps; melting plastic and injecting it into the cavity to fill the gaps between the contact sections of the two groups of terminals; cooling and solidifying the plastic, then removing the injection mold to obtain the terminal module.

To solve the above technical problems, the present invention presents another technical solution in an alternative embodiment: A data cable, comprising a cable body, a connector and a terminal module which are provided on one end of the cable body; the terminal module comprises an insulating piece and two groups of terminals, each group of terminals comprises a plurality of terminals arranged at intervals; each terminal comprises a first transition section and a contact section connected in sequence; the direction of the terminal towards an adjacent terminal is defined as the width direction, a plurality of first transition sections are bent in the same direction along the width direction; the two groups of terminals are provided on the insulating piece, and the contact section of each terminal is partially exposed out of the insulating piece forming a first contact point; a gap is formed between two adjacent contact sections of each group of terminals, and the corresponding gaps of the two groups of terminals are through and the two groups of terminals are mated with the insulating piece; the terminal module is embedded in the connector, the connector defining an alignment slot, the first contact point being disposed at the bottom of the alignment slot.

Compared with the prior art, the group of terminals, terminal module, terminal module molding method and data cable provided in the embodiments of the present invention have the following advantages:

In one embodiment of the present invention, a group of terminals is provided. The group of terminals comprises a plurality of terminals arranged at intervals. Each terminal comprises a first transition section and a contact section. The first transition section and the contact section of each terminal are connected in sequence. The direction of the terminal towards an adjacent terminal is defined as the width direction. A plurality of first transition sections are bent in the same direction along the width direction. Because a plurality of first transition sections are bent in the same direction along the width direction and the first transition section and the contact section of each terminal are connected in sequence, the contact section of each terminal is offset relative to the end of the first transition section away from the contact section in the width direction. This offset forms an avoidance structure. Because the contact sections are without offset in the width direction, the contact sections of existing groups of terminals are arranged in a staggered manner, which hinders injection molding. The avoidance structures of the present invention can leave through gaps between adjacent contact sections to facilitate injection molding. When the groups of terminals of the present invention are used for injection molding, because of the bending of the first transition sections, the contact sections generate the offsets. During injection molding, the offsets of the contact sections leave sufficient gaps to ensure the smooth injection of plastic. Therefore, the plastic fully fills the gaps to ensure the overall structural strength and durability.

BRIEF DESCRIPTION OF DRAWINGS

In order to more clearly illustrate the technical solutions of the embodiments of the present disclosure, the drawings needed to be used in the description of the embodiments will be briefly introduced below. Obviously, the drawings in the following description are some embodiments of the present disclosure. Those of ordinary skill in the art can also obtain other drawings based on these drawings without exerting creative work.

Figure 1:
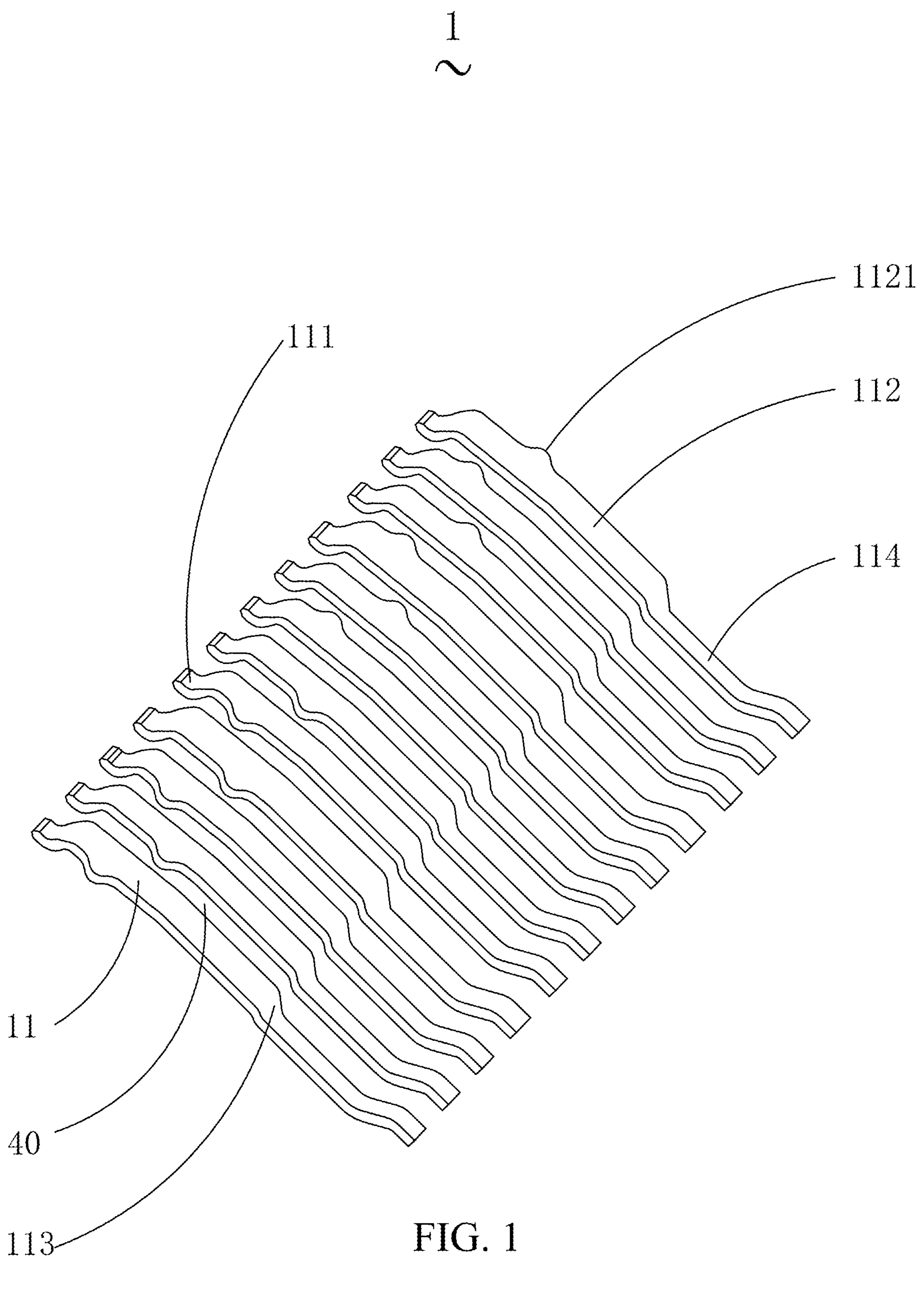
FIG. 1 is a three-dimensional structural schematic diagram of the group of terminals provided by the first embodiment of the present invention.

In the drawings, the parts represented by each number are listed as follows:

- 1. group of terminals; 11. terminal; 40. gap; 111. first transition section; 112. contact section; 113. second transition section; 114. pin; 1101. tongue plate; 1102. main body; 1103. inclined surface; 1121□protrusion; 1122□first contact point; 1123□first contact section; 1124. second contact section; 11211□arc-shaped protrusion;
- 100. terminal module; 110. insulating piece;
- 200. data cable; 210. cable body; 211. connector; 212. circuit board; 220. magnetic head; 221 second contact point; 2111. alignment slot.

DETAILED DESCRIPTION

In order to make the purpose, technical solutions and advantages of the present disclosure much clear, the present disclosure will be further described in detail below with reference to the accompanying drawings and implementation examples. It should be understood that the specific embodiments described here are only used to explain the present disclosure and are not intended to limit the present disclosure.

It should be noted that when an element is referred to as being "fixed" to another element, it can be directly on the other element or intervening elements may also be present. When an element is referred to be "connected" to another element, it can be directly connected to the other element or there may also be intervening elements present. The terms "vertical," "horizontal," "left," "right" and similar expressions are used herein for illustrative purposes only.

In the present disclosure, the orientations or positional relationships indicated by terms "on", "below", "left", "right", "front", "back", "top", "bottom", "inner", "outer", "middle", "vertical", "horizontal", "longitudinal", etc. are based on the orientations or positional relationships shown in the drawings. These terms are mainly used to better describe the present disclosure and its embodiments and are not intended to limit the indicated device, element or component to having a specific orientation, or to be constructed and operated in a specific orientation.

Moreover, some of the above terms may also be used to express other meanings in addition to indicating orientation or positional relationships. For example, the term "on" may also be used to express a certain dependence relationship or connection relationship in some cases. For those of ordinary skill in the art, the specific meanings of these terms in the present disclosure can be understood according to specific circumstances.

In addition, the terms "mount," "dispose," "provide," "connect" are to be construed broadly. For example, it can be a fixed connection, a detachable connection, or an integral structure; it can be a mechanical connection or an electrical connection; it can be a direct connection, an indirect connection through an intermediary, or an internal connection between two devices, elements or components. For those of ordinary skill in the art, the specific meanings of the above terms in the present disclosure can be understood according to specific circumstances.

Figure 2:
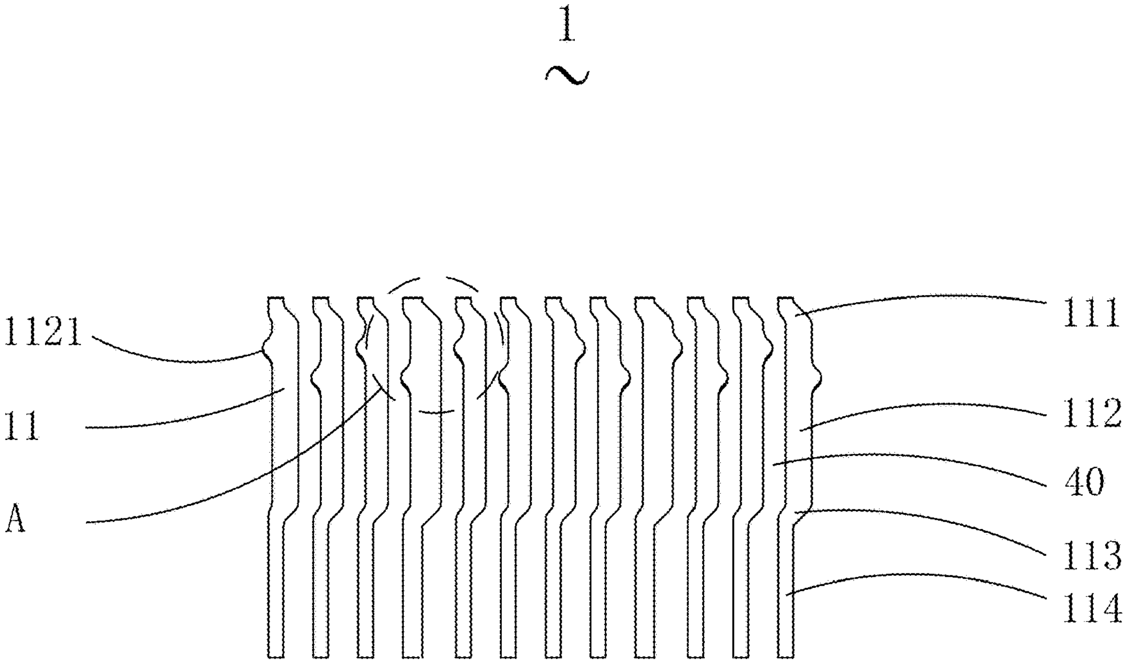
FIG. 2 is a top view of the group of terminals provided by the first embodiment of the present invention.
Figure 3:
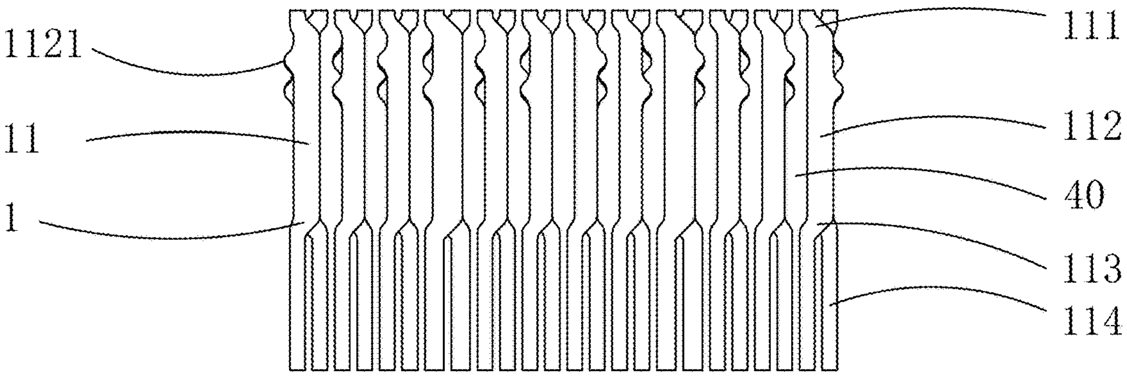
FIG. 3 is a top view of two groups of terminals arranged oppositely.

Please refer to FIGS. 1 to 3, a first embodiment of the present invention provides a group of terminals 1. The group of terminals 1 comprises a plurality of terminals 11 arranged at intervals. Each terminal 11 comprises a first transition section 111 and a contact section 112. The first transition section 111 and the contact section 112 of each terminal 11 are connected in sequence. The direction of the terminal 11 towards an adjacent terminal 11 is defined as the width direction. A plurality of first transition sections 111 are bent in the same direction along the width direction.

Understandably, because the plurality of first transition sections 111 are bent in the same direction along the width direction, the first transition section 111 and the contact section 112 of each terminal 11 are connected in sequence, the contact section 112 of each terminal 11 is offset in the width direction relative to the end of the first transition section 111 away from the contact section 112. This offset forms an avoidance structure. Because the contact sections 112 are without offset in the width direction, the contact sections 112 of existing groups of terminals 1 are arranged in a staggered manner, which hinders injection molding. The avoidance structures can leave a larger through gap 40 for easy injection molding. When the groups of terminals 1 of the present invention are used for injection molding, due to the bending of the first transition sections 111, the offset generated by the contact sections 112 leave sufficient gaps 40 to ensure the smooth injection of plastic. Therefore, the plastic fully fills the gaps 40 to ensure the overall structural strength and durability.

It should be noted that the plurality of first transition sections 111 are bent in the same direction along the width direction can be arc-shaped bending or angular bending, which is not limited herein. The plurality of first transition sections 111 are bent in the same direction along the width direction, causing at least a portion of the each contact section 112 to deviate from the end of the first transition section 111 away from the contact section 112 in the width direction, thereby forming an offset.

It should be noted that because the plurality of first transition sections 111 of the groups of terminals 1 are bent in the same direction in the width direction to form avoidance structures. When such a group of terminals 1 is used to manufacture a data cable, two groups of terminals 1 are set opposite to each other, which causes the corresponding contact sections 112 of the two groups of terminals 1 to approach each other in the width direction. Please refer to FIG. 3. FIG. 3 is a top plan view of the two groups of terminals 1 set opposite to each other, showing that the offsets of the contact sections 112 create larger gaps 40. From the top view, the contact sections 112 of the two groups of terminals 1 overlap, sharing the area occupied by the contact sections 112. This design can create larger gaps 40 compared to those without avoidance structures. If there is no avoidance structure in the width direction, the two groups of terminals 1 set opposite to each other result in the contact sections 112 being staggered to form a blockage, which hinders the injection molding.

Please refer to FIG. 1, defining the direction perpendicular to the width direction and to the long side of each contact section 112 as the height direction, the first transition sections 111 are bent along the height direction.

Understandably, because the first transition section 111 of each terminal 11 is bent along the height direction, when two oppositely disposed groups of terminals 1 are used for processing, the two corresponding groups of terminals 1 can be extended separated by a certain distance, forming a space available for accommodating the circuit board, facilitating subsequent processing of the connection between the circuit board and the terminals 11, and enhancing the compactness of the structure.

Please refer to FIGS. 1 and 2, each terminal 11 further comprises a second transition section 113 and a pin 114, the first transition section 111, the contact section 112, the second transition section 113, and the pin 114 of each terminal 11 are connected in sequence, and the first transition section 111 and the second transition section 113 of each terminal 11 are bent in opposite directions in the width direction.

Understandably, since each terminal 11 further comprises a second transition section 113 and a pin 114, the first transition section 111, the contact section 112, the second transition section 113, and the pin 114 of each terminal 11 are connected in sequence, and the pins 114 provide a connection end for the terminals 11 to be connected to the circuit board; the first transition section 111 and the second transition section 113 of each terminal 11 are bent in the opposite direction in the width direction, so that in each terminal 11, the bending of the first transition section 111 along the width direction and the bending of the second transition section 113 in the opposite direction are offset to each other. Because of the bending of the first transition sections 111 and the second transition sections 113, only the contact sections 112 in the group of terminals 1 are offset outwardly outstretched to form avoidance structures in the width direction, so as to facilitate the subsequent injection molding, ensuring that the avoidance structure is set precisely only at the contact section 112 of each terminal 11.

Please refer to FIGS. 1 and 2, the contact section 112 of each terminal 11 is provided with a protrusion 1121 extending in a width direction.

Understandably, because the protrusion 1121 extending in the width direction on the contact section 112 of each terminal 11, the contact area of the contact sections 112 is enlarged, and the larger contact area enhances the stability of the electrical connection.

Figure 4:
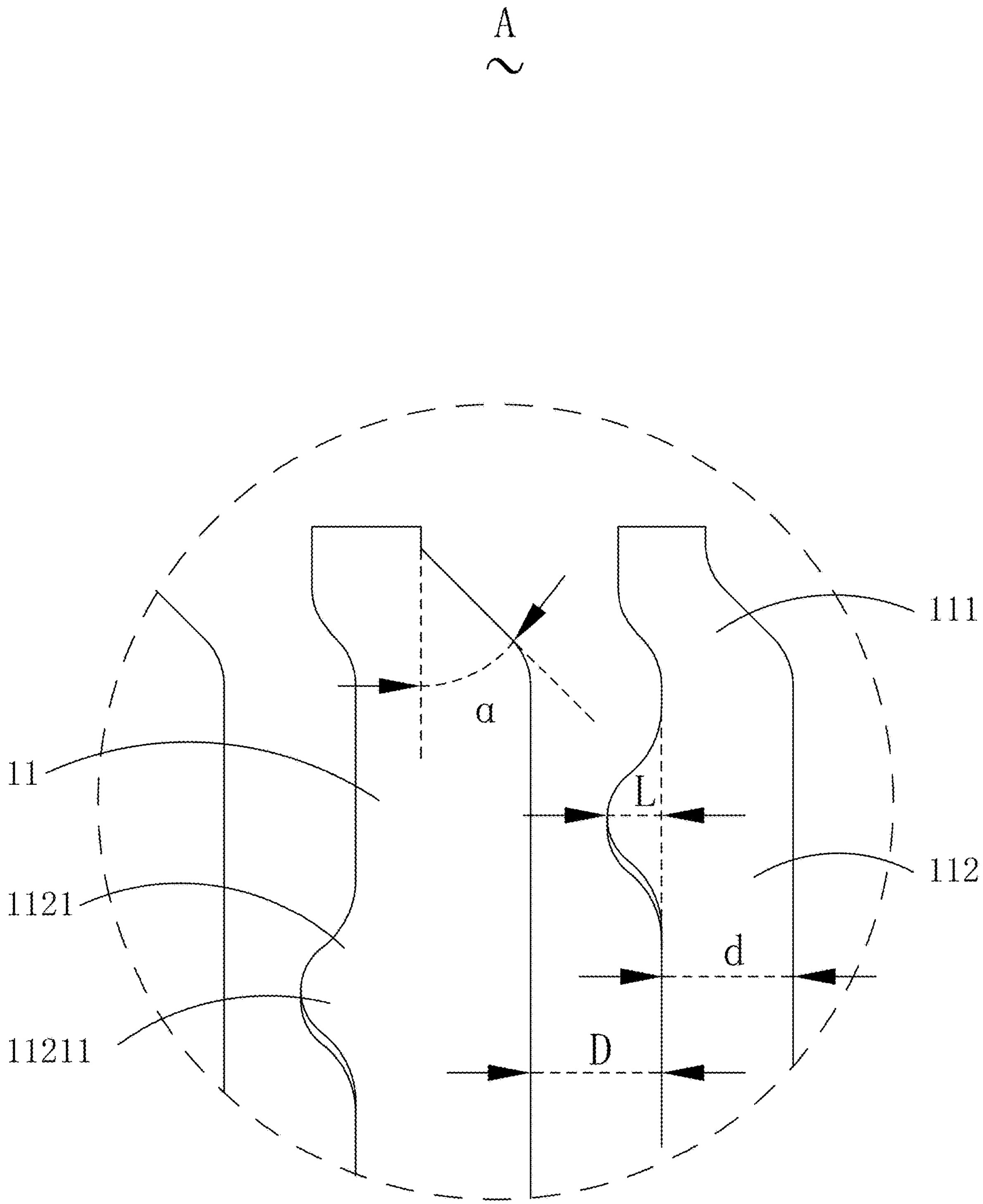
FIG. 4 is an enlarged view of the structure of part A in FIG. 3.

Please refer to FIGS. 2 and 4, further, the protrusion 1121 is an arc-shaped protrusion 11211, and the ratio of the spacing distance of the adjacent contact sections 112 to the maximum distance of each arc-shaped protrusion 11211 protruding in the width direction is greater than or equal to 2.

It is to be understood that the protrusion 1121 of each terminal 11 is an arc-shaped protrusion 11211, and the arcuate shape of the arc-shaped protruding portions 11211 is conducive to reducing the flow resistance of the plastic during injection molding. Referring to FIG. 4, a spacing distance of the adjacent contact sections 112 is defined as D. The spacing distance of the adjacent contact sections 112 refers to the distance of the adjacent contact sections 112 in the width direction, and the maximum distance of each arc-shaped protrusion 11211 protruding in the width direction is L. The ratio of the spacing distance of the adjacent contact sections 112 to the maximum distance of each arc-shaped protrusion 11211 protruding in the width direction is greater than or equal to 2, and it can guarantee that sufficient space for plastic filling between adjacent contact sections 112, reducing the injection molding void rate, and at the same time ensuring a minimum safety distance between adjacent contact sections 112, preventing short circuits because of the contact of the protrusions 1121.

Referring to FIG. 2, the corresponding protrusions 1121 of adjacent terminals 11 are staggered in the width direction.

Understandably, the corresponding protrusions 1121 of adjacent terminals 11 are staggered in the width direction instead of being provided at the same position, so that the protrusions 1121 are arranged more uniformly, avoiding the positional arrangement of the protrusions 1121 from causing a deviation in the injection molding effect, and thus enabling the plastic to fill the gaps 40 more uniformly during injection molding.

Referring to FIG. 4, the first transition section 111 of each terminal 11 is bent at an angle between 20° and 70° along the width direction.

Understandably, the angle defining the first transition section 111 to bend in the width direction is $\alpha$, with $20° \leq \alpha \leq 70°$. It should be noted that angle $\alpha$ refers to the included angle formed between the side of the first transition section 111 bent relative to the width direction and the width direction. When the angle is too small, the degree of bending is insufficient, and an excessively long first transition section 111 is required to form a sufficiently sized gap 40; when the angle is too large, the stress concentration is easy to fracture. The range of bending angles from 20° to 70° ensures both the compactness of the structure and the stability of the structure.

Referring to FIG. 4, the ratio of the width of the contact section 112 of each terminal 11 to the spacing distance between two adjacent contact sections 112 is between 0.5 and 2.

Understandably, the width of the contact section 112 of each terminal 11 is defined as d, and the spacing distance between two adjacent contact sections 112 is D, with $0.5 \leq d/D \leq 2$. When the ratio is too large, it easily leads to the excessively narrow spacing between the two adjacent contact sections 112, making it difficult for the plastic to flow in; when the ratio is too small, the terminal 11 is too thin and easy to be deformed. The ratio range of 0.5 to 2 ensures that the spacing width is matched to the size of the terminals 11, realizing a higher injection filling rate. The width of each contact section 112 is associated with the current-carrying capacity when energized, and the width of each contact section 112 and the spacing distance between two adjacent contact sections 112 are associated with insulation safety. The above range of ratios is also able to achieve a balance between current-carrying capacity and insulation safety.

Please refer to FIGS. 1 to 3, 5 and 6, a second embodiment of the present invention provides a terminal module 100. The terminal module 100 comprises an insulating piece 110 and two groups of terminals 1. Each group of terminals 1 comprises a plurality of terminals 11 arranged at intervals. Each terminal 11 comprises a first transition section 111 and a contact section 112 connected in sequence. The direction of the terminal 11 towards an adjacent terminal 11 is defined as the width direction. A plurality of first transition sections 111 are bent in the same direction along the width direction. The two groups of terminals 1 are provided on the insulating piece 110, and the contact section 112 of each terminal is partially exposed out of the insulating piece 110 forming a first contact point 1122. A gap 40 is formed between two adjacent contact sections 112 of each group of terminals 1, and the corresponding gaps 40 of the two groups of terminals 1 are through and the two groups of terminals 1 are mated with the insulating piece 110.

It can be understood that the two groups of terminals 1 of the terminal module 100 are arranged opposite to each other and are fixed by the insulating piece 110. Because the contact section 112 of each terminal is partially exposed out of the insulating piece 110 to form the first contact point 1122, the insulating piece 110 plays a role of insulation and position fixing for the groups of terminals 1, and the contact section 112 of each terminal is partially out of the insulating piece 110 and exposed to the first contact point 1122 to facilitate connection. As a gap 40 is formed between two adjacent contact sections 112 of each group of terminals 1, and the first transition section 111 of each terminal is bent in the same direction along the width direction to form an avoidance structure, so that the corresponding gaps 40 of two groups of terminals 1 are through, and unobstructed through gaps 40 are formed between two adjacent contact sections 112 of the two groups of terminals 1. During the integral injection molding of the insulating piece 110, the plastic can smoothly flow into the gaps 40 for filling, ensuring that the insulating piece 110 formed by injection molding has high structural strength. It should be noted that for existing terminal modules with split assembly structures, the following steps are required: first, inject plastic into a single group of terminals to form an injection-molded part; then, assemble the two injection-molded parts. This results in a structure where the two groups of terminals are arranged one above the other. Compared with the existing split assembly structure, the gaps 40 allow the terminal module 100 of the second embodiment of the present invention to be formed through integral injection molding. This reduces the number of processes, thereby lowering costs and improving manufacturing efficiency.

Please refer to FIG. 3, it is to be noted that because the first transition section 111 of each terminal is bent in the same direction along the width direction, the contact section 112 of each terminal forms an avoidance structure. From a top view perspective, the contact sections 112 of the two groups of terminals 1 are arranged to overlap. Such design reduces the occupied area and thereby creates larger gaps 40, avoiding the situation of blocking the plastic by staggered contact sections 112 during injection because of the absence of avoidance structures. As a specific embodiment, the two oppositely disposed groups of terminals 1 are placed into an injection mold for plastic filling operation, the plastic flows along the gaps 40 and fills the space between the two groups of terminals 1, ultimately forming the insulating piece 110, thus manufacturing the terminal module 100. The pins 114 in the terminal module 100 can be connected to a PCB board, and the first contacts points 1122 can be used to connect with external contacts, so that the terminal module 100 plays the role of connection and signal transmission. The offsets of the contact sections 112 leave larger through gaps 40 for injection molding, which ensures the smooth injection of plastic, and improves the integrity of the injection molding and the structural strength of the insulating piece 110.

Further, please refer to FIGS. 5 to 8, the contact section 112 of each terminal 11 comprises a first contact section 1123 and a second contact section 1124, the first contact section 1123 and the second contact section 1124 are disposed sequentially along a direction away from the first transition section 111. The insulating piece 110 comprises a tongue plate 1101 and a main body 1102, and the tongue plate 1101 is connected to the main body 1102. The tongue plate 1101 is disposed with an inclined surface 1103, and the inclined surface 1103 is bent relative to the main body 1102, and the first contact section 1123 is bent relative to the second contact section 1124 and corresponds to the inclined surface 1103.

As the tongue plate 1101 is provided with the inclined surface 1103, the inclined surface 1103 is bent relative to the main body 1102. The inclined surface 1103 and the central axis of the main body 1102 form a tilt angle. The thickness of the tongue plate 1101 gradually increases in the direction approaching the main body 1102, making the plugging and unplugging action of an external plug more effortless. The contact section 112 is divided into a first contact section 1123 and a second contact section 1124. The first contact section 1123 is bent relative to the second contact section 1124 and corresponds to the inclined surface 1103. The first contact section 1123 also forms an inclined angle relative to the second contact section 1124, so that in the plugging and unplugging process of the external plug, the inclined surface 1103 decomposes the force into a component parallel to the inclined surface 1103 and a component perpendicular to the inclined surface 1103, wherein the parallel component helps push the external plug to carry out the plugging and unplugging process, while the perpendicular component helps to overcome friction and avoid damage to the tongue plate 1101. The first contact section 1123 is bent relative to the inclined surface 1103 so that the first contact section 1123 and the inclined surface 1103 can be matched to ensure a good connection between the first contact point 1122 and the external plug.

Figure 8:
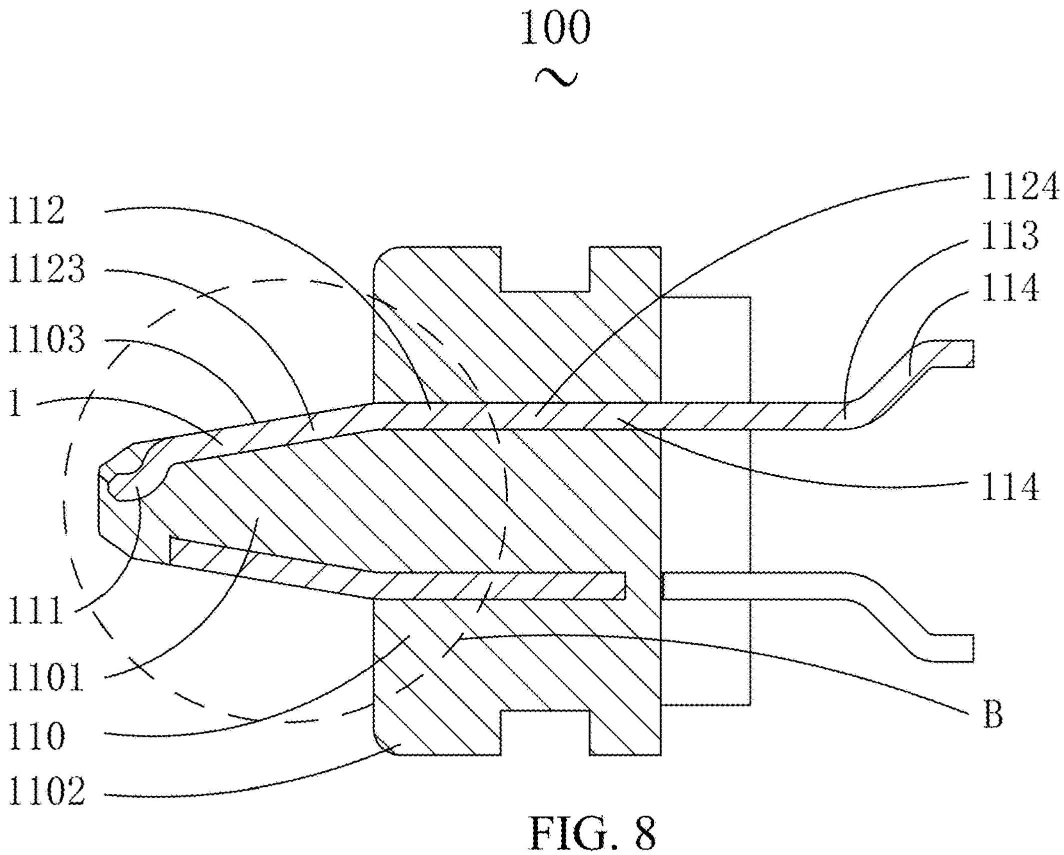
FIG. 8 is a cross-sectional structural schematic diagram of the terminal module provided by the second embodiment of the present invention.
Figure 9:
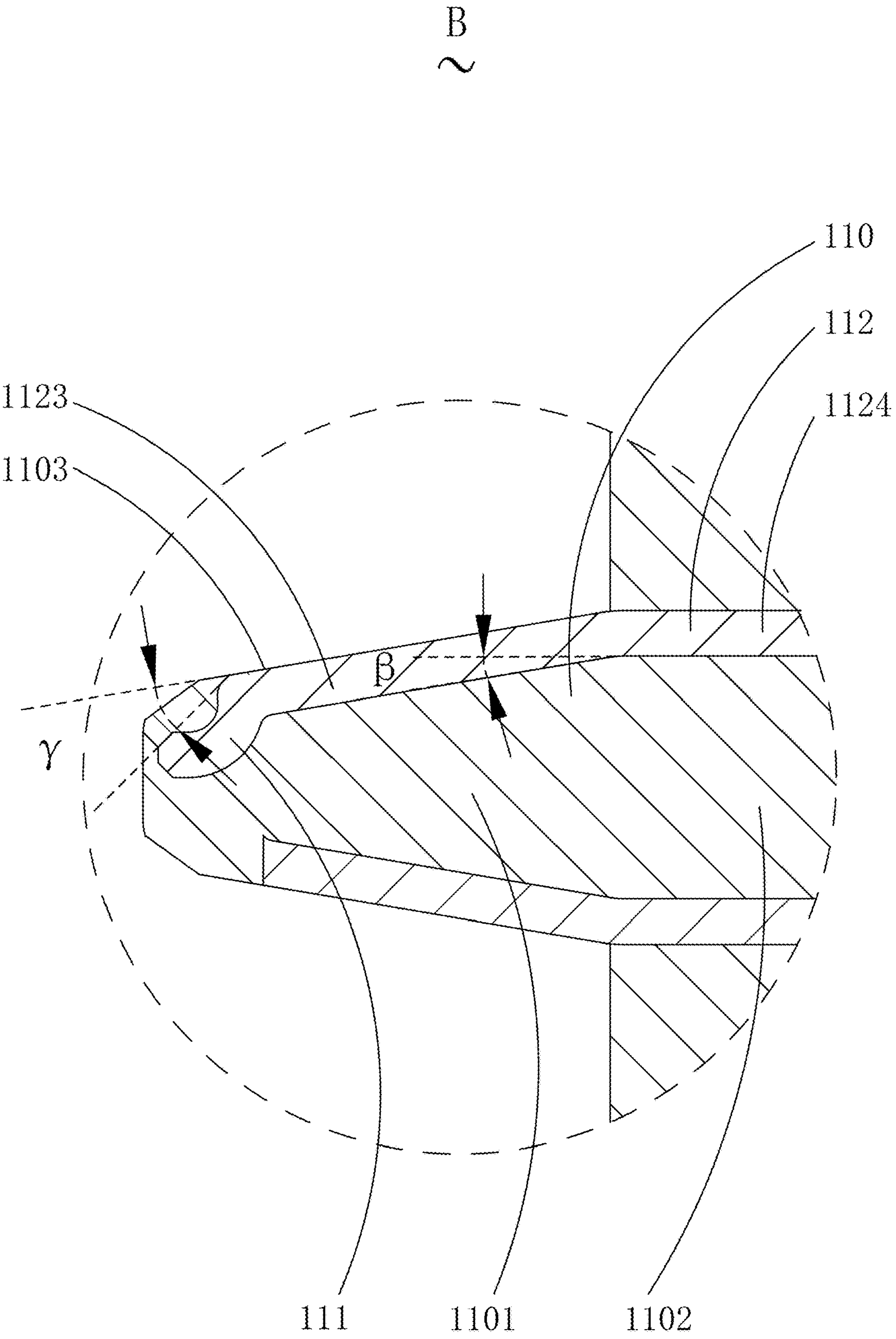
FIG. 9 is an enlarged view of the structure of part B in FIG. 8.

Please refer to FIGS. 8 and 9, the bending angle of the inclined surface 1103 relative to the main body 1102 is between 10° and 45°.

Understandably, the bending angle of the inclined surface 1103 relative to the main body 1102 is defined as $\beta$, with $10° \leq \beta \leq 45°$. The bending angle of the inclined surface 1103 relative to the main body 1102 is between 10° and 45°, which can effectively guide the insertion and extraction and reduce the friction loss. If the bending angle is too large, it will cause stress concentration at the root of the tongue plate 1101, making it prone to cracking; if it is too small, the guiding function of the inclined surface 1103 will be reduced. This bending angle range optimizes the structural continuity between the tongue plate 1101 and the main body 1102.

Please refer to FIG. 8 and FIG. 9, the angle at which the first transition section 111 is bent relative to the first contact section 1123 in each terminal 11 is greater than the angle at which the inclined surface 1103 is bent relative to the main member body 1102.

Understandably, define the angle at which the first transition section 111 is bent relative to the first contact section 1123 as γ, and γ>β. The angle at which the first transition section 111 is bent relative to the first contact section 1123 is greater than the angle at which the inclined surface 1103 is bent relative to the main body 1102. This forms a stepped avoidance structure. It enables a larger space to be formed between the two oppositely arranged groups of terminals 1 for plastic filling. This enhances the overall structural strength.

Figure 6:
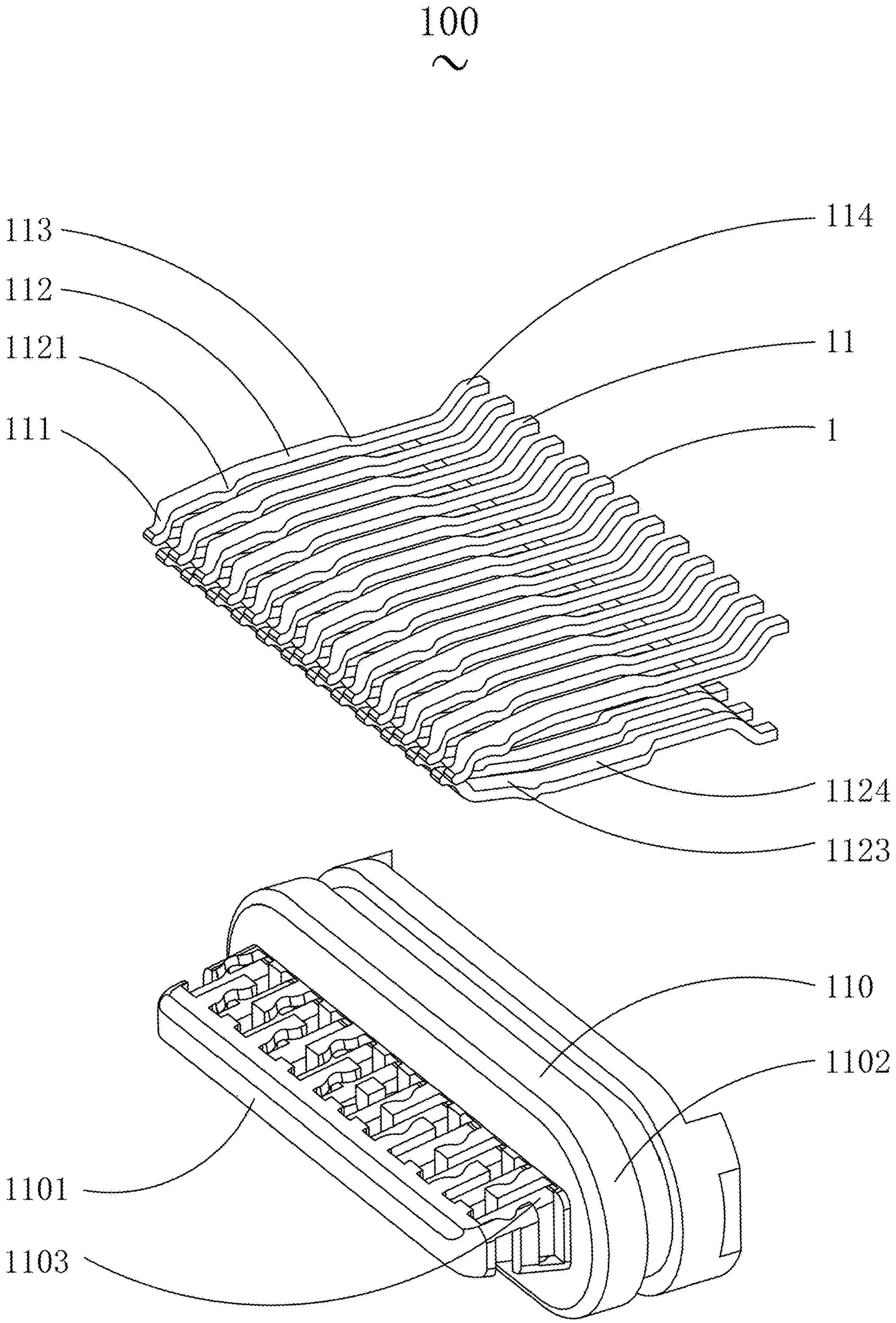
FIG. 6 is an exploded structural schematic diagram of the terminal module provided by the second embodiment of the present invention.
Figure 7:
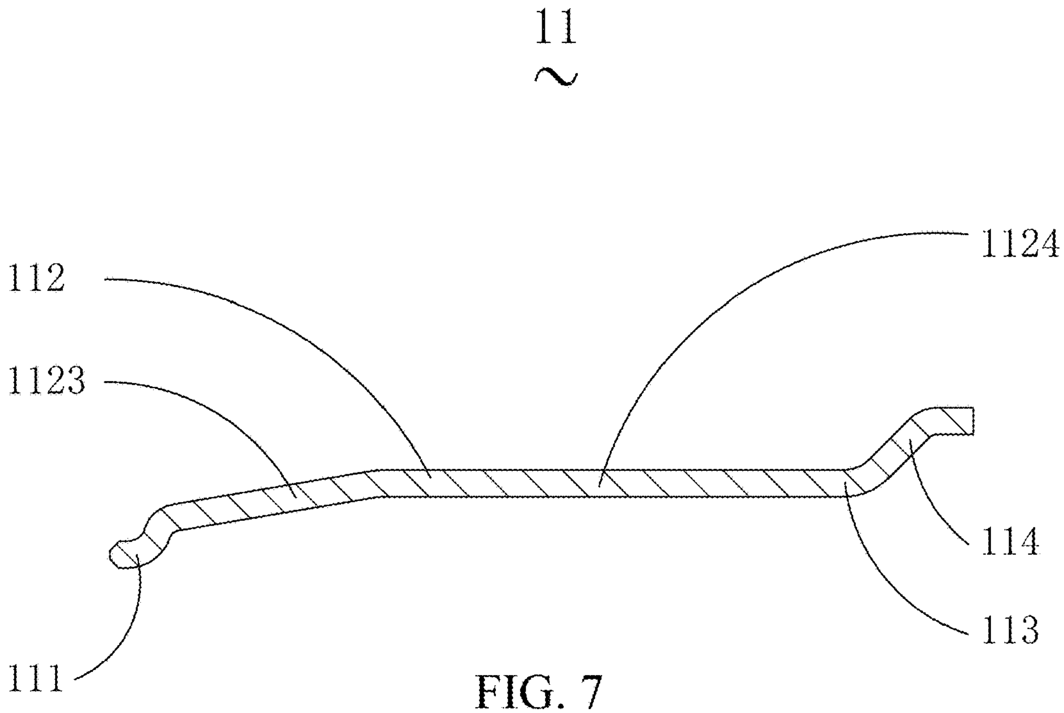
FIG. 7 is a cross-sectional structural schematic diagram of the terminal of the terminal module provided by the second embodiment of the present invention.

Please refer to FIG. 6 and FIG. 8, the two groups of terminals 1 are arranged oppositely. The corresponding contact sections 112 of one group of terminals 1 are in one plane, and the corresponding contact sections 112 of the other group of terminals 1 are in another plane. Each group of terminals 1 comprises twelve terminals 11.

Understandably, since the Type-C interface has 24 contact points, these contact points are distributed on the A-side and B-side of the interface, with 12 contact points on each side, and their functions are symmetrical to each other. By arranging two groups of terminals 1 oppositely, where the corresponding contact sections 112 of one group of terminals 1 are in one plane, and the corresponding contact sections 112 of other group of terminals 1 are in another plane, and the number of terminals 11 in each group of terminals 1 is twelve. In this way, the twelve terminals 11 of each of the two groups of terminals 1 can correspond to the twelve contact points on the A-side and B-side of the Type-C interface respectively. This ensures that the terminals 11 can fully utilize all the functions of the Type-C interface, including data transmission, charging, audio, video transmission, etc., to achieve a full-function Type-C interface.

It should be noted that the twelve terminals 11 in each of the two groups of terminals 1 is merely a preferred embodiment, and the number of terminals 11 in other quantities is not limited herein.

Figure 5:
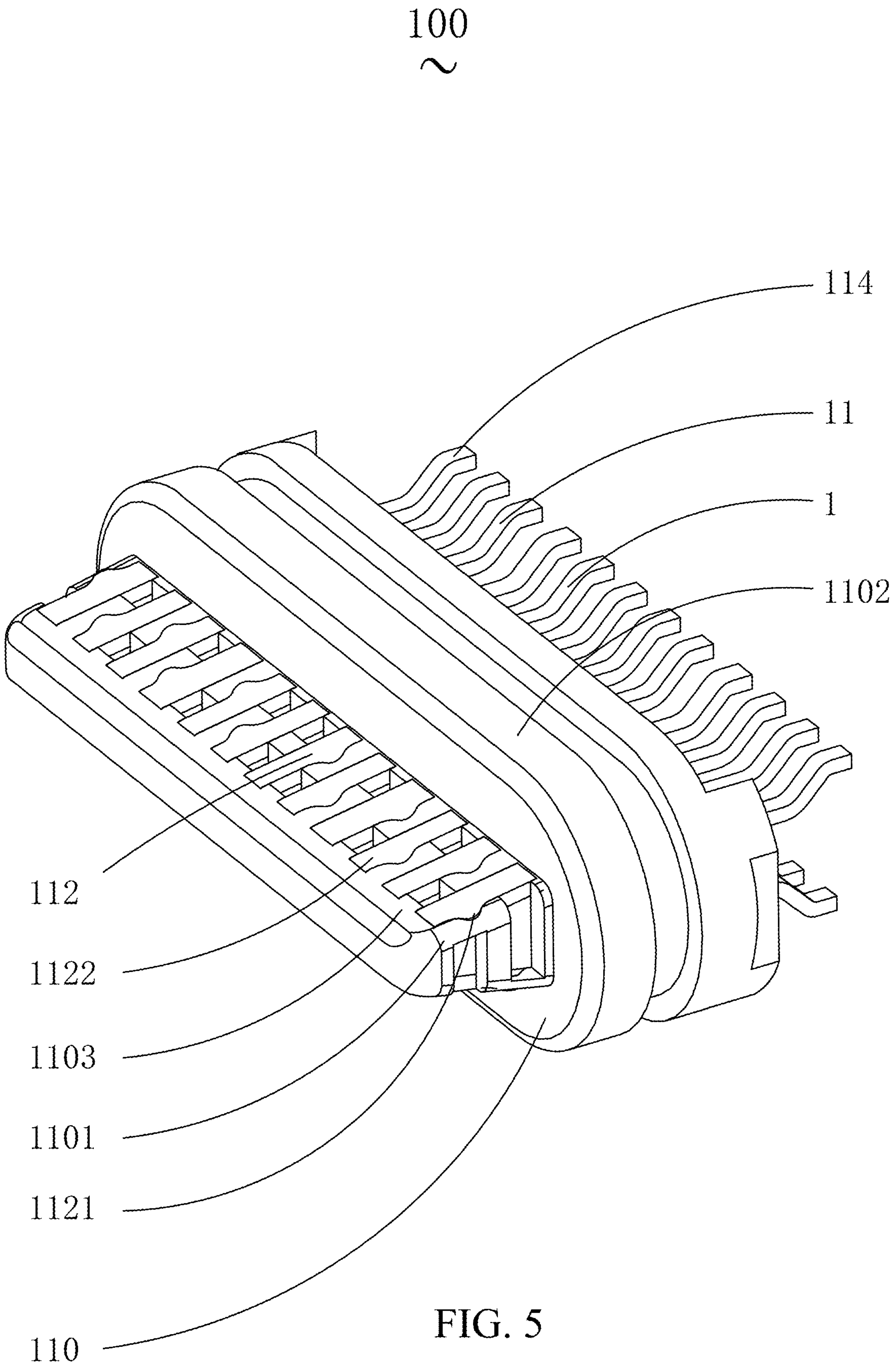
FIG. 5 is a three-dimensional structural schematic diagram of the terminal module provided by the second embodiment of the present invention.

Please refer to FIG. 5, the insulating piece 110 is an integrally injection-molded plastic part.

Understandably, the integral injection molding process can produce the insulating piece 110 with complex details and complex features. Such process is highly cost-effective, which enables the unit manufacturing cost to be significantly reduced, and realize mass production, and improves the production efficiency.

Please refer to FIG. 3 and FIG. 6, the direction perpendicular to both the width direction and to the long side of the contact section 112 is defined as the height direction. The projections of the corresponding terminals 11 of the two groups of terminals 1 in the height direction at least partially overlap.

Understandably, because the projections of the corresponding terminals 11 of the two groups of terminals 1 in the height direction at least partially overlap, a continuous plastic flow channel is formed. This eliminates the injection molding obstacles caused by the staggered arrangement of the contact sections 112 of the terminals 11, thereby improving the injection filling quality.

Please refer to FIG. 1, FIG. 3, FIG. 5 and FIG. 10, a third embodiment of the present invention provides a method for molding a terminal module comprising:

S1: Arranging two groups of terminals 1 oppositely within a cavity of an injection mold, each group of terminals 1 comprises a plurality of terminals 11 arranged at intervals; each terminal 11 comprises a first transition section 111 and a contact section 112 connected in sequence; the direction of the terminal 11 towards an adjacent terminal 11 is defined as the width direction, a plurality of first transition sections 111 are bent in the same direction along the width direction, so that the contact sections 112 of the two groups of terminals 1 overlap to form gaps 40.

S2: Melting plastic and injecting it into the cavity to fill the gaps 40 between the contact sections 112 of the two groups of terminals.

S3: Cooling and solidifying the plastic, then removing the injection mold to obtain the terminal module 100.

Understandably, by arranging the two groups of terminals 1 opposite to each other within the cavity of the injection mold, gaps 40 are formed between adjacent contact sections 112 of each group of terminals 1. Moreover, because the first transition section 111 of each terminal 11 is bent in the same direction along the width direction, the contact section 112 of each terminal 11 forms an avoidance structure, and the corresponding gaps 40 of the two groups of terminals 1 to are through. This results in unobstructed through gaps 40 between the adjacent contact sections 112 of the two groups of terminals 1. During injection molding, the molten plastic can flow smoothly through these gaps 40, ensuring complete filling of the gaps 40 between the terminals 11 and preventing strength defects caused by voids.

Figure 10:
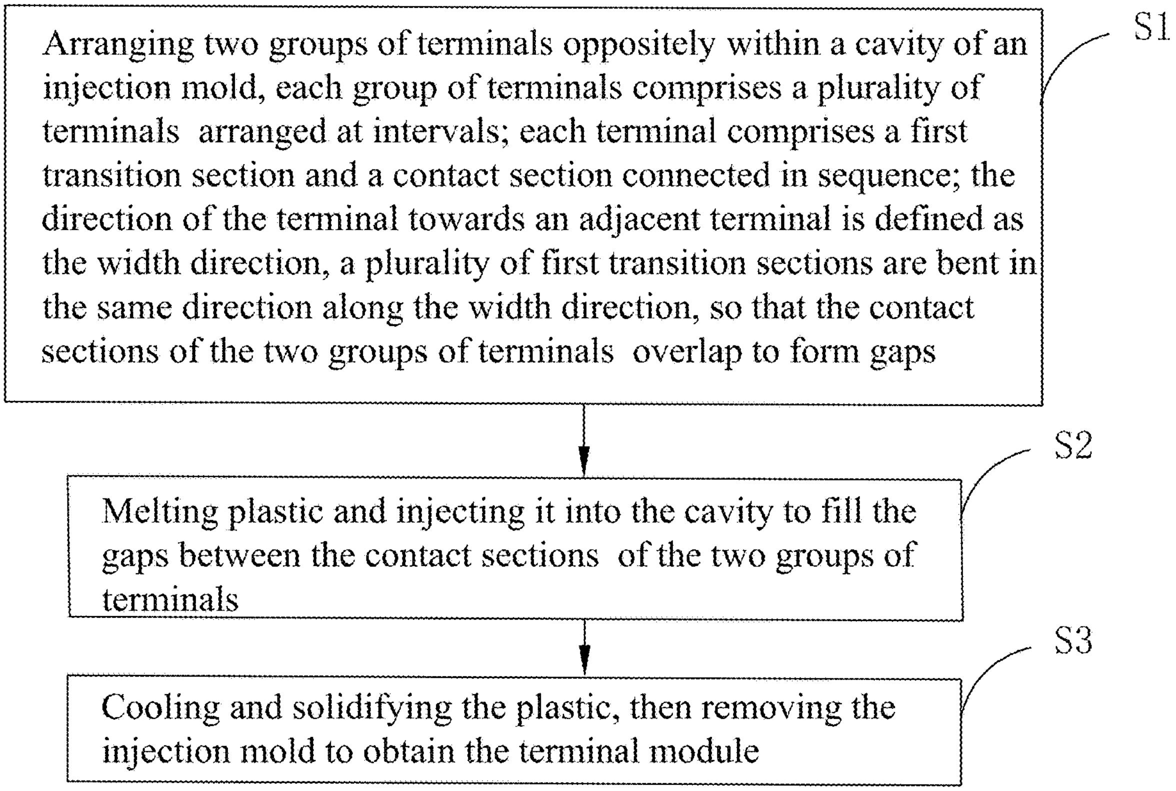
FIG. 10 is a process flow chart of a terminal module molding method provided by the third embodiment of the present invention.

Please refer to FIG. 5 and FIG. 10. Further, the terminal module 100 comprises an insulating piece 110, and when the plastic is melted and injected into the cavity, the plastic wraps the two groups of terminals 1 to form the insulating piece 110, with part of each contact section 112 exposed out of the insulating piece 110 to form a first contact point 1122.

Understandably, the insulating piece 110 seals the groups of terminals 1, which can effectively prevent liquids or dust from invading the interior of the terminal module 100. Each contact section 112 is partially exposed out of the insulating piece 110 to form a first contact point 1122. The plastic wraps and fixes the position of the first contact points 1122, which can reduce poor contact caused by looseness.

Please refer to FIG. 1, FIG. 5, and FIG. 11 to FIG. 13, a fourth embodiment of the present invention provides a data cable 200. The data cable 200 comprises a cable body 210. One end of the cable body 210 is provided with a connector 211 and a terminal module 100. The terminal module 100 comprises an insulating piece 110 and two groups of terminals 1. The two groups of terminals 1 comprise a plurality of terminals 11 arranged at intervals. Each terminal comprises a first transition section 111 and a contact section 112 connected in sequence. The direction of the terminal 11 towards an adjacent terminal 11 is defined as the width direction, a plurality of first transition sections 111 are bent in the same direction along the width direction. The two groups of terminals 1 are provided on the insulating piece 110, and the contact section 112 of each terminal 11 is partially exposed out of the insulating piece 110 forming a first contact point 1122. A gap 40 is formed between two adjacent contact sections 112 of each group of terminals 1, and the corresponding gaps 40 of the two groups of terminals 1 are through and the two groups of terminals 1 are mated with the insulating piece 110. The terminal module 100 is embedded in the connector 211, the connector 211 defining an alignment slot 2111, the first contact point 1122 being disposed at a bottom of the alignment slot 2111.

Understandably, by defining the alignment slot 2111 in the connector 211, the time for connection alignment can be reduced to achieve precise plugging and unplugging. The first contact points 1122 are disposed at the bottom of the alignment slot 2111, and the alignment slot 2111 also accommodates the first contact points 1122 and protects the first contact points 1122 from damage.

Figure 11:
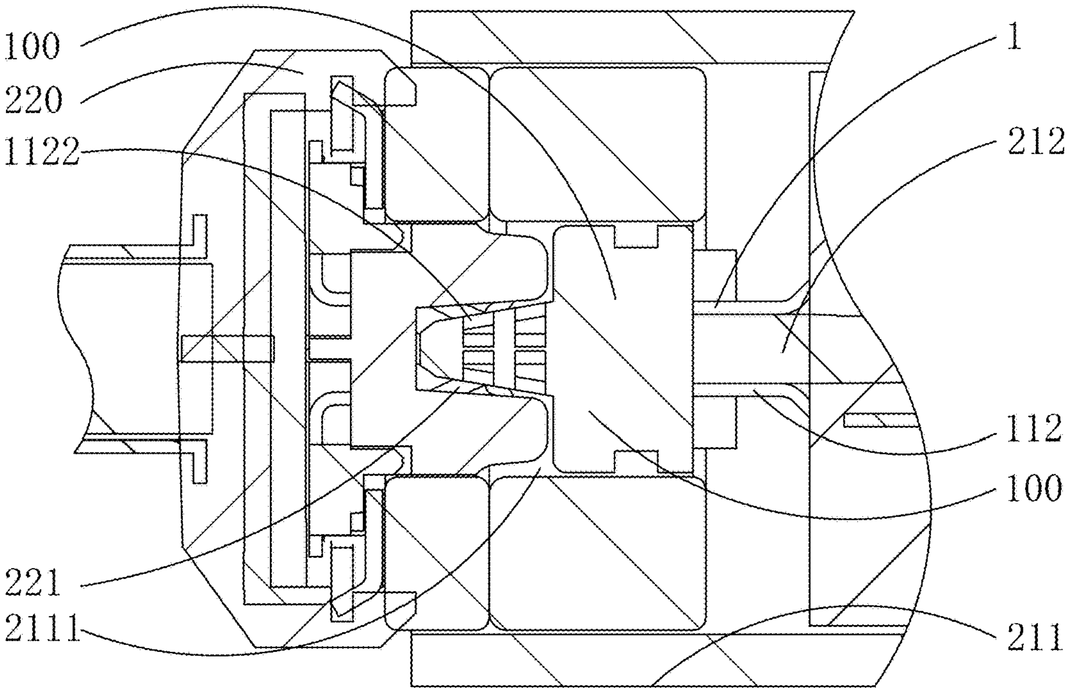
FIG. 11 is a partial cross-sectional structural schematic diagram of the data cable provided by the fourth embodiment of the present invention.
Figure 12:
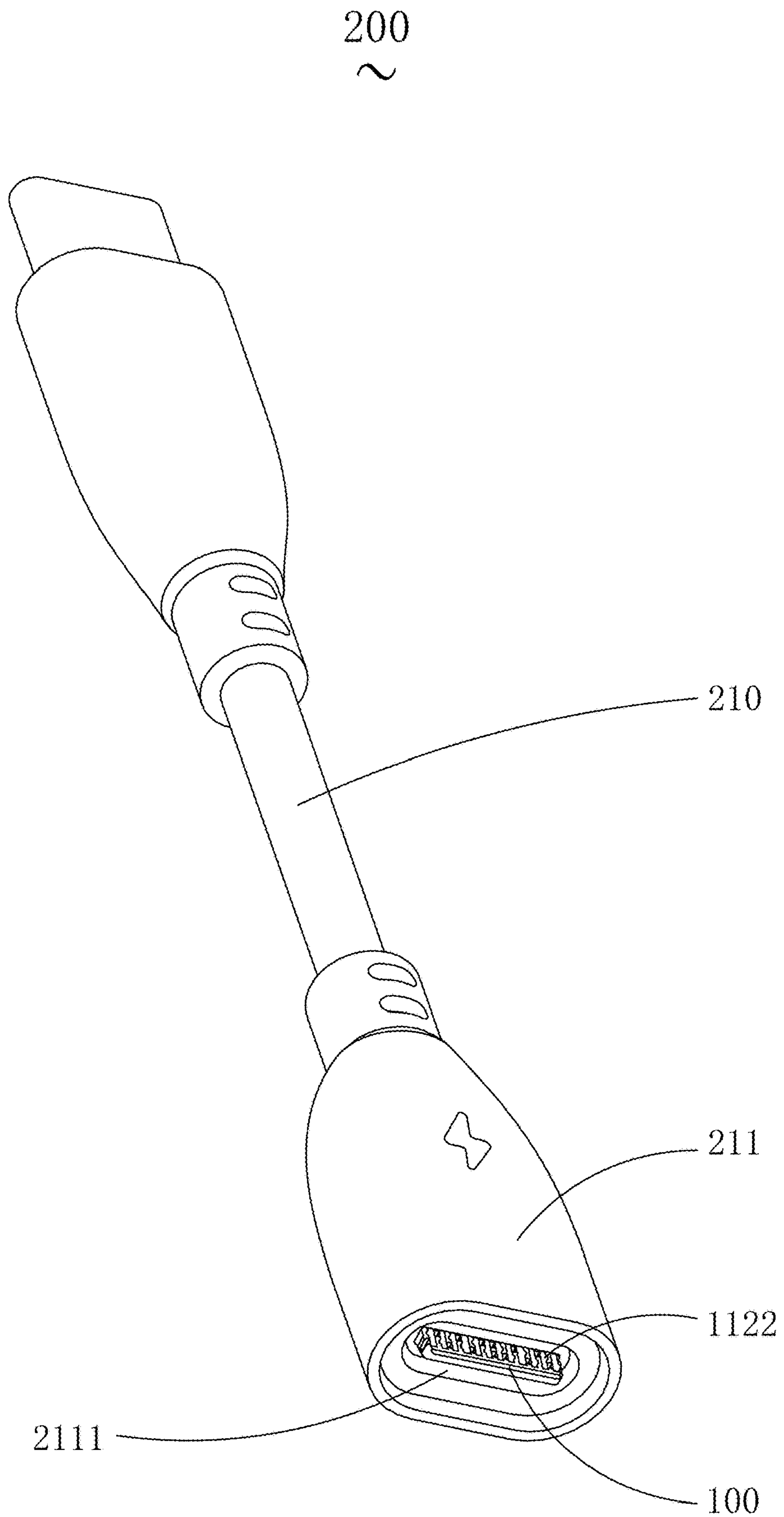
FIG. 12 is a three-dimensional structural schematic diagram of the data cable provided by the fourth embodiment of the present invention.
Figure 13:
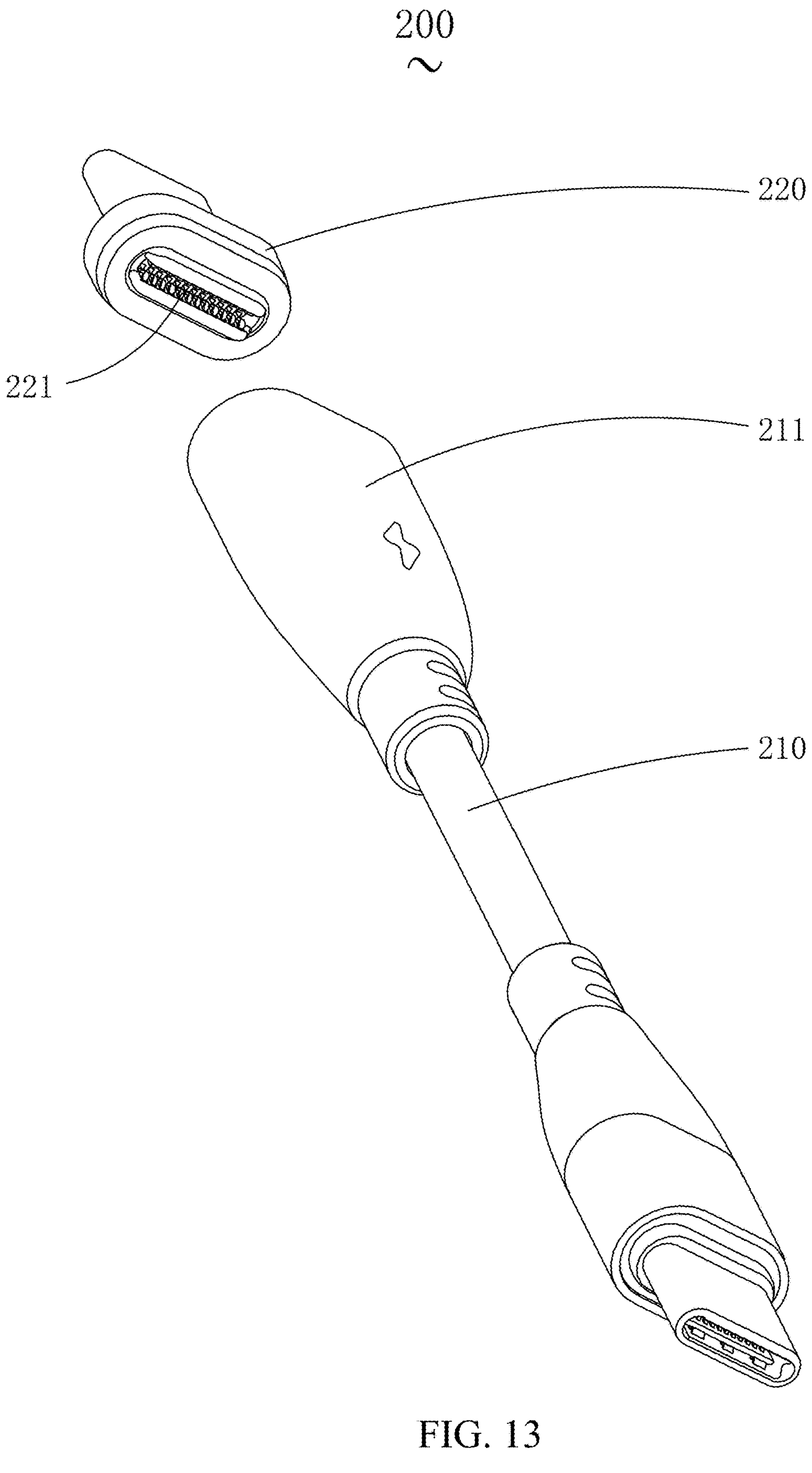
FIG. 13 is an exploded structural schematic diagram of the data cable provided by the fourth embodiment of the present invention.

Please refer to FIG. 11 to FIG. 13, the data cable 200 further comprises a magnetic head 220. The magnetic head 220 is magnetically attachable to the connector 211. The magnetic head 220 is provided with second contact points 221 corresponding to the first contact points 1122, when the magnetic head 220 is magnetically coupled to the connector 211, the first contact points 1122 are electrically connected to the corresponding second contact points 221.

Understandably, during the plugging and unplugging process of the conventional data cable 200, the interface is prone to wear, and long-term use may lead to poor contact at the interface. The magnetic head 220 can be inserted into the device interface for a long time, effectively preventing dust and dirt from entering the charging port of the device, thereby reducing poor contact or short circuit problems caused by dust accumulation. Magnetic attraction also ensures the stability during connection and operational convenience of the data cable 200, reducing mechanical wear and electrical poor contact caused by plugging and unplugging operations. When the magnetic head 220 is magnetically coupled with the connector 211, the first contact points 1122 are electrically connected to the corresponding second contact point 221. This connection method effectively reduces interface wear and extends the service life of electronic devices and the data cable 200.

Please refer to FIG. 11, the data cable 200 further comprises a circuit board 212, the circuit board 212 disposed between the corresponding contact sections 112 of the two groups of terminals 1.

Understandably, the circuit board 212 can integrate signal conversion, data processing, or power management chips. The circuit board 212 is disposed between the corresponding contact sections 112 of the two groups of terminals 1, enabling multi-functional integration within a limited space, improving structural compactness, and being more suitable for thin and light devices.

Compared with the prior art, the group of terminals, terminal module, terminal module molding method, and data cable provided in the embodiments of the present invention have the following advantages:

1. One embodiment of the present invention provides a group of terminals, which comprises a plurality of terminals arranged at intervals. Each terminal comprises a first transition section and a contact section. The first transition section and the contact section of each terminal are connected in sequence. The direction of the terminal towards an adjacent terminal is defined as the width direction. A plurality of first transition sections are bent in the same direction along the width direction. Because a plurality of first transition sections are bent in the same direction along the width direction, and the first transition section and the contact section of each terminal are connected in sequence, the contact section of each terminal is offset relative to the end of the first transition section away from the contact section in the width direction. This offset forms an avoidance structure. Because the contact sections are without offset in the width direction, the contact sections of existing groups of terminals are arranged in a staggered manner, which hinders injection molding. The avoidance structures of the present invention can leave through gaps between adjacent contact sections to facilitate injection molding. When the groups of terminals of the present invention are used for injection molding, due to the bending of the first transition sections, the offsets generated by the contact sections leave sufficient gaps to ensure the smooth injection of plastic. Therefore, the plastic fully fills the gaps to ensure the overall structural strength and durability.
2. In one embodiment of the present invention, defining the direction perpendicular to the width direction and to the long side of each contact section as the height direction, the first transition sections are bent along the height direction. Because the first transition sections are bent along the height direction, when two oppositely disposed groups of terminals are used for processing, the two corresponding groups of terminals can be extended and separated by a certain distance, forming a space available for accommodating the circuit board, facilitating subsequent processing of the connection between the circuit board and the terminals, and enhancing the compactness of the structure.
3. In one embodiment of the present invention, a terminal further comprises a second transition section and a pin. The first transition section, the contact section, the second transition section, and the pin of each terminal are connected sequentially, and the first transition section and the second transition section of each terminal are bent in opposite directions in the width direction. Since each terminal also comprises a second transition section and a pin, the first transition section, the contact section, the second transition section, and the pin of each terminal are connected in sequence, and the pins provide a connection end for the terminals to be connected to the circuit board; the first transition section and the second transition section of each terminal are bent in the opposite direction in the width direction, so that in each terminal, the bending of the first transition section along the width direction and the bending of the second transition section in the opposite direction are offset to each other. Because of the bending of the first transition sections and the second transition sections, only the contact sections of the groups of terminals are offset outwardly outstretched to form the avoidance structures in the width direction, so as to facilitate the subsequent injection molding, ensuring that the avoidance structure is set precisely only at the contact section of each terminal.
4. In one embodiment of the present invention, the contact section of each terminal is provided with a protrusion extending in a width direction. Because the protrusion extending in the width direction on the contact section of each terminal, the contact area of the contact sections is enlarged, and the larger contact area enhances the stability of the electrical connection.
5. In one embodiment of the present invention, the protrusion of each terminal is an arc-shaped protrusion. The arc-shape of the arc-shaped protruding portion is conducive to reducing the flow resistance of the plastic during injection molding. The ratio of the spacing distance of the adjacent contact sections to the maximum distance of each arc-shaped protrusion protruding in the width direction is greater than or equal to 2, and it can guarantee that sufficient space for plastic filling between adjacent contact sections, reducing the injection molding void rate, and at the same time ensuring a minimum safety distance between adjacent contact sections, preventing short circuits due to contact of the protrusions.

6. In one embodiment of the present invention, the corresponding protrusions of adjacent terminals are staggered in the width direction instead of being provided at the same position, so that the protrusions are arranged more uniformly, avoiding the positional arrangement of the protrusion from causing a deviation in the injection molding effect, and thus enabling the plastic to fill the gaps more uniformly during injection molding.

7. In one embodiment of the present invention, the first transition section of each terminal is bent at an angle between 20° and 70° along the width direction. When the angle is too small, the degree of bending is insufficient, and an excessively long first transition section is required to form a sufficiently sized gap; when the angle is too large, the stress concentration is easy to fracture. The range of bending angle from 20° to 70° ensures both the compactness of the structure and the stability of the structure.

8. In one embodiment of the present invention, the ratio of the width of each contact section to the spacing distance between two adjacent contact sections is between 0.5 and 2. When the ratio is too large, it easily leads to the excessively narrow spacing between the two adjacent contact sections, making it difficult for the plastic to flow in; when the ratio is too small, each terminal is too thin and easy to be deformed. The ratio range of 0.5 to 2 ensures that the spacing width is matched to the size of the terminals, realizing a higher injection filling rate. The width of the contact section is associated with the current-carrying capacity when energized, and the width of each contact section and the spacing distance between two adjacent contact sections are associated with insulation safety. The above range of ratio is also able to achieve a balance between current-carrying capacity and insulation safety.

9. In one embodiment of the present invention, the terminal module comprises an insulating piece and two groups of terminals. The two groups of terminals are provided on an insulating piece, and the contact section of each terminal is partially exposed out of the insulating piece forming a first contact point. A gap is formed between two adjacent contact sections of each group of terminals, and the corresponding gaps of the two groups of terminals are through and two groups of terminals 1 are mated with the insulating piece. Because the contact section of each terminal is partially exposed to the insulating piece to form the first contact point, the insulating piece plays a role of insulation and position fixing for the groups of terminals, and the contact section of each terminal is partially exposed out of the insulating piece and exposed to the first contact point to facilitate connection. As a gap is formed between two adjacent contact sections of each group of terminals, and the first transition section of each terminal is bent in the same direction along the width direction to form an avoidance structure, so that the corresponding gaps of the two groups of terminals are through, and unobstructed through gaps are formed between two adjacent contact sections of the two groups of terminals. During the integral injection molding of the insulating part, the plastic can smoothly flow into the gaps for filling, ensuring that the insulating part formed by injection molding has high structural strength.

10. In one embodiment of the present invention, the contact section comprises a first contact section and a second contact section, the first contact section and the second contact section are disposed sequentially along a direction away from the first transition section. The insulating piece comprises a tongue plate and a main body, and the tongue plate is connected to the main body. The tongue plate is disposed with an inclined surface, and the inclined surface is bent relative to the main body, and the first contact section is bent relative to the second contact section and corresponds to the inclined surface. As the tongue plate is provided with the inclined surface, the inclined surface is bent relative to the main body. The contact section is divided into a first contact section and a second contact section. The first contact section is bent relative to the second contact section and corresponds to the inclined surface. The first contact section also forms an inclined angle relative to the second contact section, so that in the plugging and unplugging process of the external plug, the inclined surface decomposes the force into a component parallel to the inclined surface and a component perpendicular to the inclined surface, wherein the parallel component helps push the external plug to carry out the plugging and unplugging process, while the perpendicular component helps to overcome friction and avoid damage to the tongue plate. The first contact section is bent relative to the inclined surface so that the first contact section and the inclined surface can be matched to ensure a good connection between the first contact point and the external plug.

11. In one embodiment of the present invention, the bending angle of the inclined surface relative to the main body is between 10° and 45°, which can effectively guide the insertion and extraction and reduce the friction loss. If the bending angle is too large, it will cause stress concentration at the root of the tongue plate, making it prone to cracking; if it is too small, the guiding function of the inclined surface will be reduced. This bending angle range optimizes the structural continuity between the tongue plate and the main body.

12. In one embodiment of the present invention, the bending angle of the first transition section relative to the first contact section in each terminal is greater than the bending angle of the inclined surface relative to the main body. This forms a stepped avoidance structure, which allows a larger space to be formed between two oppositely arranged groups of terminals for plastic filling, thereby enhancing the overall structural strength.

13. In one embodiment of the present invention, the two groups of terminals are arranged oppositely, the corresponding contact sections of one group of terminals is in one plane, and the corresponding contact sections of the other group of terminals is in another plane. Each group of terminals comprises twelve terminals. Since the Type-C interface has 24 contact points, these contact points are distributed on the A-side and B-side of the interface, with 12 contact points on each side, and their functions are symmetrical to each other. By arranging two groups of terminals opposite to each other, where the corresponding contact sections of one group of terminals are on one plane, and the corresponding contact sections of the other group of terminals are on another plane, and the number of terminals in each of the two groups of terminals is twelve. In this way, the twelve terminals of each of the two groups of terminals can correspond to the twelve contact points on the A-side and B-side of the Type C interface respectively. This ensures that the terminals can fully utilize all the functions of the Type-C interface, including data transmission, charging, audio, video transmission, etc., to achieve a full-function Type-C interface.

14. In one embodiment of the present invention, the integral injection molding process can produce the insulating piece with complex details and complex features. Such process is highly cost-effective, which enables the unit manufacturing cost to be significantly reduced, and realizes mass production, and improves the production efficiency.

15. In one embodiment of the present invention, the direction perpendicular to both the width direction and to the long side of the contact section is defined as the height direction. The projections of the corresponding terminals of the two groups of terminals in the height direction at least partially overlap. This forms a continuous plastic flow channel, eliminating the injection molding obstacles caused by the staggered arrangement of the contact sections of the terminals and improving the filling quality.

16. A method for molding a terminal module according to one embodiment of the present invention comprises the following steps: Arranging two groups of terminals oppositely within a cavity of an injection mold, so that the contact sections of the two groups of terminals overlap to form gaps; melting plastic and injecting it into the cavity to fill the gaps between the contact sections of the two groups of terminals; cooling and solidifying the plastic, then removing the injection mold to obtain the terminal module. By arranging the two groups of terminals opposite each other within the cavity of the injection mold, gaps are formed between adjacent contact sections of each group of terminals. Moreover, because the first transition section of each terminal is bent in the same direction along the width direction, the contact section 112 of each terminal forms an avoidance structure, and the corresponding gaps of the two groups of terminals are through. This results in unobstructed through gaps between the adjacent contact sections of the two groups of terminals. During injection molding, the molten plastic can flow smoothly through these gaps, ensuring the gaps between terminals are fully filled and preventing strength defects caused by voids.

17. In one embodiment of the present invention, the terminal module comprises an insulating piece. The terminal module comprises an insulating piece, and when the plastic is melted and injected into the cavity, the plastic wraps the two groups of terminals to form the insulating piece, with part of each contact section exposed out of the insulating piece to form a first contact point. The insulating piece seals the groups of terminals, which can effectively prevent liquids or dust from invading the interior of the terminal module. Each contact section is partially exposed out of the insulating piece to form a first contact point. The plastic wraps and fixes the position of the first contact point, which can reduce poor contact caused by looseness.

18. In an embodiment of the present invention, a data cable comprises a cable body. One end of the cable body is provided with a connector and a terminal module. The terminal module is embedded in the connector, the connector defining an alignment slot, the first contact points being disposed at the bottom of the alignment slot. By defining an alignment slot in the connector, the time for connection alignment can be reduced to achieve precise plugging and unplugging. The first contact points are disposed at the bottom of the alignment slot, and the alignment slot also accommodates the first contact points and protects the first contact points from damage.

19. In one embodiment of the present invention, the data cable further comprises a magnetic head. The magnetic head is magnetically attachable to the connector. The magnetic head is provided with second contact points corresponding to the first contact points. When the magnetic head is magnetically coupled to the connector, the first contact points are electrically connected to the corresponding second contact points. During the plugging and unplugging process of the conventional data cable, the interface is prone to wear, and long-term use may lead to poor contact at the interface. The magnetic head can be inserted into the device interface for a long time, effectively preventing dust and dirt from entering the charging port of the device, thereby reducing poor contact or short circuit problems caused by dust accumulation. Magnetic attraction also ensures the stability during connection and operational convenience of the data cable, reducing mechanical wear and electrical poor contact caused by plugging and unplugging operations. When the magnetic head is magnetically coupled with the connector, the first contact points are electrically connected to the corresponding second contact points. This connection method effectively reduces interface wear and extends the service life of electronic devices and the data cable.

20. In one embodiment of the present invention, the data cable further comprises a circuit board, the circuit board disposed between the contact sections corresponding to the two groups of terminals. The circuit board can integrate signal conversion, data processing, or power management chips. The circuit board is disposed between the corresponding contact sections of the two groups of terminals, enabling multi-functional integration within a limited space, improving structural compactness, and being more suitable for thin and light devices.

The above are only preferred embodiments of the present invention and are not intended to limit the present invention. Any modifications, equivalent replacements, improvements, etc. made within the principles of the present invention shall be included in the protection scope of the present invention.

What is claimed is:

1. A terminal module, comprising:

an insulating piece and two groups of terminals, wherein each group of terminals comprises a plurality of terminals arranged at intervals;

wherein each terminal comprises a first transition section and a contact section connected in sequence;

a direction of the terminal towards an adjacent terminal is defined as a width direction, a plurality of first transition sections are bent in the same direction along the width direction;

the two groups of terminals are provided on the insulating piece, and the contact section of each terminal is partially exposed out of the insulating piece forming a first contact point;

a gap is formed between two adjacent contact sections of each group of terminals, and the corresponding gaps of the two groups of terminals are through and the two groups of terminals are mated with the insulating piece;

the contact section of each terminal is offset in the width direction relative to the end of the first transition section away from the contact section;

the contact section of each terminal is provided with a protrusion extending in the width direction;

corresponding protrusions of adjacent terminals in each group of terminals are staggered in the width direction;

a direction perpendicular to the width direction and to the long side of each contact section is defined as a height direction;

protrusions corresponding to the two groups of terminals are staggered in the height direction.

2. The terminal module according to claim 1, wherein the contact section of each terminal comprises a first contact section and a second contact section, the first contact section and the second contact section are disposed sequentially along a direction away from the first transition section;

the insulating piece comprises a tongue plate and a main body, and the tongue plate is connected to the main body;

the tongue plate is disposed with an inclined surface, and the inclined surface is bent relative to the main body, and the first contact section is bent relative to the second contact section and corresponds to the inclined surface.

3. The terminal module according to claim 2, wherein the inclined surface is bent at an angle between 10° and 45° relative to the main body.

4. The terminal module according to claim 3, wherein an angle at which the first transition section is bent relative to the first contact section in each terminal is greater than the angle at which the inclined surface is bent relative to the main body.

5. The terminal module according to claim 1, wherein the two groups of terminals are arranged oppositely, the corresponding contact sections of one group of terminals are in one plane, and the corresponding contact sections of the other group of terminals are in another plane, each group of terminals comprises 12 terminals.

6. The terminal module according to claim 1, wherein the insulating piece is an integrally injection-molded plastic part.

7. The terminal module according to claim 1, wherein projections of the corresponding terminals of the two groups of terminals in the height direction at least partially overlap.

8. The terminal module according to claim 1, wherein the first transition sections are bent along the height direction.

9. The terminal module according to claim 8, wherein each terminal further comprises a second transition section and a pin, the first transition section, the contact section, the second transition section, and the pin of each terminal are connected sequentially, and the first transition section and the second transition section of each terminal are bent in opposite directions in the width direction.

10. The terminal module according to claim 1, wherein the protrusion of each terminal is an arc-shaped protrusion, and the ratio of the spacing distance of the adjacent contact sections to the maximum distance of each arc-shaped protrusion protruding in the width direction is greater than or equal to 2.

11. The terminal module according to claim 1, wherein the first transition section of each terminal is bent at an angle between 20° and 70° in the width direction.

12. The terminal module according to claim 1, the ratio of the width of each contact section to the spacing distance between two adjacent contact sections is between 0.5 and 2.

13. A data cable, comprising: a cable body, a connector and a terminal module which are provided on one end of the cable body;

wherein the terminal module comprises an insulating piece and two groups of terminals, each group of terminals comprises a plurality of terminals arranged at intervals;

each terminal comprises a first transition section and a contact section connected in sequence;

a direction of the terminal towards an adjacent terminal is defined as a width direction, a plurality of first transition sections are bent in the same direction along the width direction;

the two groups of terminals are provided on the insulating piece, and the contact section of each terminal is partially exposed out of the insulating piece forming a first contact point;

a gap is formed between two adjacent contact sections of each group of terminals, and the corresponding gaps of the two groups of terminals are through and the two groups of terminals are mated with the insulating piece;

the terminal module is embedded in the connector, the connector defining an alignment slot, the first contact points being disposed at a bottom of the alignment slot;

the contact section of each terminal is offset in the width direction relative to the end of the first transition section away from the contact section;

the contact section of each terminal is provided with a protrusion extending in the width direction;

corresponding protrusions of adjacent terminals in each group of terminals are staggered in the width direction;

a direction perpendicular to the width direction and to the long side of each contact section is defined as a height direction;

protrusions corresponding to the two groups of terminals are staggered in the height direction.

14. The data cable according to claim 13, wherein the data cable further comprises a magnetic head, the magnetic head is magnetically attachable to the connector, the magnetic head is provided with second contact points corresponding to the first contact points, when the magnetic head is magnetically coupled to the connector, the first contact points are electrically connected to the corresponding second contact points.

15. The data cable according to claim 13, wherein the data cable comprises a circuit board, the circuit board disposed between the corresponding contact sections of the two groups of terminals.

* * * * *